United States Patent [19]

Tamari

[11] Patent Number: 4,682,089
[45] Date of Patent: Jul. 21, 1987

[54] ROBOT CONTROL SYSTEM

[75] Inventor: Masumi Tamari, Tama, Japan

[73] Assignee: Kabushiki Kaisha Toshiba, Kawasaki, Japan

[21] Appl. No.: 808,499

[22] Filed: Dec. 13, 1985

[30] Foreign Application Priority Data

Dec. 17, 1984 [JP] Japan .................. 59-264626

[51] Int. Cl.⁴ .............................................. G05B 19/42
[52] U.S. Cl. ...................................... 318/568; 318/563; 318/565
[58] Field of Search .............. 318/626, 563, 565, 568 I

[56] References Cited

U.S. PATENT DOCUMENTS

| | | | |
|---|---|---|---|
| 4,374,423 | 2/1983 | Kundler et al. | 318/563 X |
| 4,412,162 | 10/1983 | Kitamura | 318/563 |
| 4,475,160 | 10/1984 | Inaba | 318/568 |
| 4,550,378 | 10/1985 | Nozawa et al. | 318/565 X |
| 4,580,085 | 4/1986 | Eto et al. | 318/563 X |

FOREIGN PATENT DOCUMENTS 50-132386 4/1975 Japan .

*Primary Examiner*—Benjamin Dobeck
*Attorney, Agent, or Firm*—Schwartz, Jeffery, Schwaab, Mack, Blumenthal & Evans

[57] ABSTRACT

In a control system for a robot having a servo motor driving an operation axis, position error detecting means, detects an error of the actual position with reference to a desired instantaneous position, and a drive circuit receives the position error for supplying a current to the servo motor to reduce the position error. The control system is characterized by means for limiting the current supplied from the drive circuit to the servo motor thereby to limit the torque of the servo motor when the servo motor is driving the operation axis in a first mode in which movement of the operation axis is subject to undesired obstruction.

8 Claims, 6 Drawing Figures

FIG.2

| | | |
|---|---|---|
| 7 | MOV | PNT 1 |
| 8 | OPT | 100 4 |
| 9 | SPD | 20 |
| 10 | MOV | PNT 2 |
| | | |
| 21 | STOP | |
| 22 | 100 | REM |

REMEDY  PROGRAM

40   STOP

ROBOT CONTROL SYSTEM

BACKGROUND OF THE INVENTION

The present invention relates to a control system for a robot having a servo motor for driving a robot operation axis. The control system is capable of limiting the torque and also causing the robot operation axis to "retract" when the position error of the axis becomes excessive.

When an operating axis of a moving part, such as an arm, of a robot is driven by a servo motor, a position control system, such as that shown in FIG. 5, is generally adopted.

In FIG. 5 reference character B* denotes pulses whose frequency is proportional to a reference (or target) velocity. The pulses B* are supplied from a suitably programmed computer, not shown. The particular program used varies depending on the operation being performed by the robot. For instance, when a part is to be inserted into a hole of a workpiece, as shown in FIG. 6, the work schedule essentially consists of moving the holder of the part to a first point above the insertion hole, and lowering the vertical axis to a second point at which the part is fully inserted.

The reference character B denotes pulses whose frequency is proportional to the actual velocity of the servo motor 4 as detected by a pulse generator 5.

An adder 1a determines the difference between the reference velocity B* and the actual velocity B and produces pulses indicating the difference ΔB of the velocity. A position error counter 1 counts the pulses and its count value indicates the position error of the operation axis driven by the servo motor 4 from the desired instantaneous position. A D/A (digital to analog) converter 2 converts the digital signal from the counter 1 into an analog signal serving as a speed reference V*, which is then applied to a drive unit 3 for driving a servo motor 4.

If, for some reason, movement of the operation axis and hence rotation of the servo motor 4 are is obstructed, the position error ΔB increases and the position error counter 1 overflows.

In a prior art system, the overflow of the counter 1 is detected and the robot is made to stop or some other remedy against the error is made.

A disadvantage of the prior art system is that when the rotation of the motor 4 is obstructed an over current flows through the servo motor 4 to cause burning of the servo motor 4 and an excessive torque of the servo motor 4 may occur, which may damage the robot. Such an over current and an excessive torque continue until the counter 1 overflows and the motor current is terminated.

For instance, assume that a robot 20, as shown in FIG. 6 is used to hold a part 30 by a holder 61 at an end of an arm 60 of a vertical axis and to insert the part 30 into an insertion hole 40. If the arm 60 and the insertion hole 60 is out of alignment, insertion of the part 30 is obstructed, and for this reason an over current flows through the servo motor 24 for driving the vertical axis and also the part 30 and the insertion hole 40 may be damaged.

Incidentally, reference numerals 21 and 22 in FIG. 6 denote servo motors for positioning the vertical axis, reference numeral 23 denotes a servo motor for a part holding operation, and reference numeral 70 denotes a control unit.

SUMMARY OF THE INVENTION

An object of the invention is to protect the servo motor and to prevent damage to the part and the workpiece, as well as the robot.

A control system according the invention is characterized by the provision of means for limiting the torque of the servo motor when the servo motor is driving an operation axis in a first mode in which movement of the operation axis is subject to undesired obstruction. Additionally, means may further be provided to transfer the control to a remedy program when the operation axis is found to have stalled.

With the arrangement of the invention, over-heating and burning-out of the servo motor and mechanical damage to the workpiece and the robot are avoided, even when there occurs an error in the operation, and the operation of the robot can be re-started while ensuring safety.

BRIEF DESCRIPTION OF THE DRAWINGS

In the accompanying drawings:

FIG. 2 is a part of a program of the computer 71;

DETAILED DESCRIPTION OF THE PREFERRED EMBODIMENT

Figure 1:
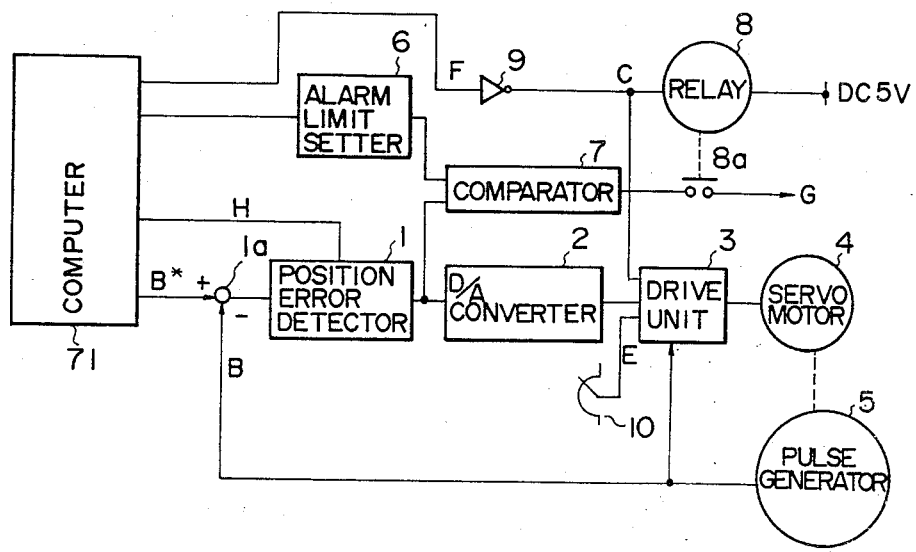
FIG. 1 is a block diagram showing a robot control system of an embodiment of the invention.

FIG. 1 shows an embodiment of the invention.

Figure 3:
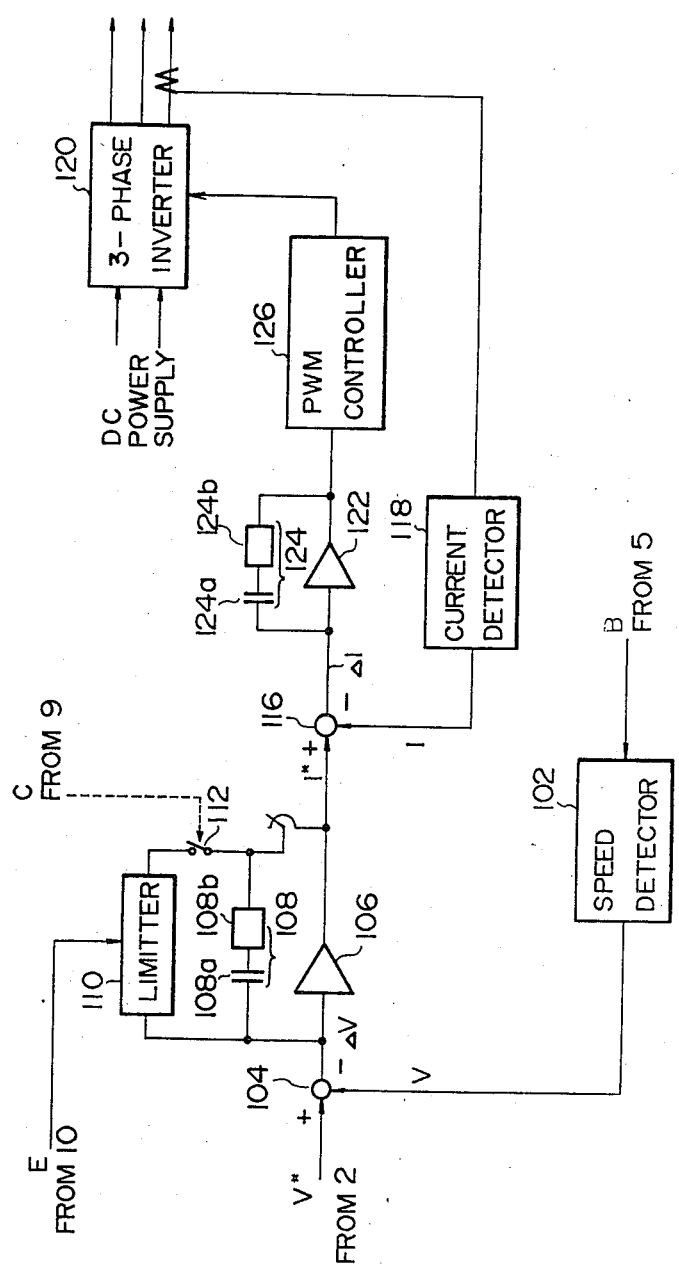
FIG. 3 is a circuit diagram showing an example of the drive unit 3 shown in FIG. 1.

In FIG. 1 reference character B* denotes pulses whose frequency is proportional to a reference (or target) velocity. The pulses B* are supplied from a suitably programmed computer 71. The particular program used varies depending on the operation being performed by the robot. For instance, when a part is to be inserted into a hole of a workpiece, as shown in FIG. 3, the work schedule essentially consists of moving the holder of the part to a first point above the insertion hole, and lowering the vertical axis to a second point at which the part is fully inserted. The program used then may be for example as shown in FIG. 2.

The respective lines of the program of FIG. 2 has the following meaning:

Line 7: Move the holder to a first point #1 (above the insertion hole).

Figure 5:
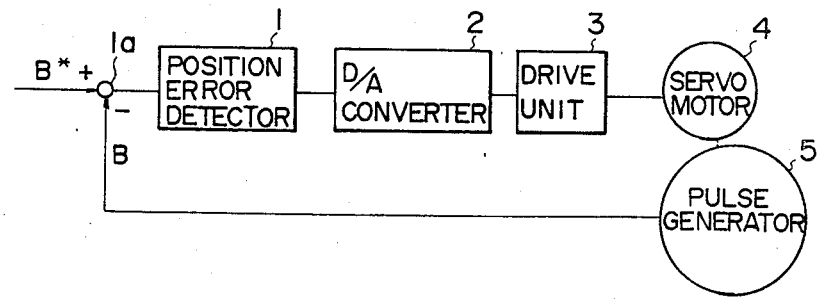
FIG. 5 is a block diagram showing a conventional robot control system.

Line 8: Start torque limiting and position error supervision on an axis #4 (which is the axis 60 of FIG. 5). If the operation axis is found to have stalled, jump to line 22 with a label 100.

Line 9: Set the speed at 20% of the full speed.

Line 10: Start moving the holder to a second point #2 (where the holder is fully inserted in the insertion hole).

Line 21: Stop the holder.

Line 22: Start a remedy program.

Line 40: Stop the remedy program.

"Torque limiting" and "position error supervision" will be apparent from the subsequent description of the entire control system.

The torque limiting and the position error supervision are effected while the holder is moved from the point #1 to the point #2 (at a 20% speed). If the operation axis is found to have stalled, the program flow is transferred to a step with a sentence number 100 to execute a remedy program.

The computer 71 produces pulses B* reflecting the 20% speed while the holder 61 is moved from point #1 to the point #2.

The reference character B denotes pulses whose frequency is proportional to the actual velocity of the servo motor 4 as detected by a pulse generator 5. Although schematically illustrated by a single line, there are actually two lines for the pulses B*, for two opposite directions of the desired movement. Similarly, there are two lines for pulses B, for two opposite (forward and reverse) directions of rotation of the servo motor 4 and hence of movement of the operation axis driven by the servo motor 4.

An adder 1a determines the difference between the reference velocity B* and the actual velocity B and produces pulses whose frequency is proportional to the difference $\Delta B$ between B* and B. A position error counter 1 counts the pulses and its count value indicates the position error of the operation axis driven by the servo motor 4 from the desired instantaneous position. A D/A (digital to analog) converter 2 converts the digital signal from the counter 1 into an analog signal serving as a speed reference V*, which is then supplied to a drive unit 3 for driving a servo motor 4.

An example of the drive unit 3 is shown in FIG. 3. As illustrated, it comprises a speed V detector 102 which receives the pulses from the pulse generator 5 and produces an analog signal indicating the speed V of the motor 4. An adder 104 determines the deviation $\Delta V$ of the detected speed V from the speed reference V* supplied from the D/A converter 2.

The deviation $\Delta V$ is applied to an operational amplifier 106 with a first order lag element 108 comprising a series connection of a capacitor 108a and a resistor 108b and a limitter 110 which limits the output voltage of the operational amplifier 106 when an analog switch 112 is closed.

The limit value E of the limitter 110 is set by a potentiometer 10 (FIG. 1) constituting a current limit setter.

The switch 112 is closed when a signal C from an inverter 9 is at logical "0" level. The input F of the inverter 9 is supplied from a computer 71 and is set at "1" when the insertion operation is effected.

The output of the operational amplifier 106 is applied as a current reference I* to an adder 116, which also receives an analog signal I supplied from a current detector 118 and indicating the output current of a three-phase inverter 120. The output of the adder 116 indicative of the current deviation $\Delta I$ is applied to an operational amplifier 122 with a first order lag element 124 comprising a series connection of a capacitor 124a and a resistor 124b.

The output of the operational amplifier 122 is applied to a PWM (pulse with modulation) controller 126 which controls the inverter 120.

The inverter 120 is connected to a DC power supply, not shown, and its three-phase output is fed to the motor 4.

Returning again to FIG. 1, a comparator 7 compares the count value (indicative of the position error) of the counter 1 with a pre-set value set in an alarm limit setter 6. The output of the comparator 7 is at a logical "1" level when the former exceeds the latter, and is outputted through a switch 8a, if it is closed, as a stall detection signal G.

The switch 8a is closed when the signal C is at "0" and hence a relay 8 is energized.

The counter 1 is cleared by a signal H, which is produced when the motor is rotated in a reverse direction.

When the insertion operation is not being carried out, the insertion signal F is at "0", so that the output C of the inverter 9 is at "1". Accordingly, the output of the operational amplifier 106 is not limited to the value E set by the current limit setter 10. Moreover, the relay 8 is not energized and hence the switch 112 is open. As a result, the stall detection signal G is not outputted regardless of the count value of the counter 1.

When the insertion operation is being carried out, the insertion signal F is at "1", so that the output C of the inverter 9 is at "0". The switch 112 is therefore closed and the output of the operational amplifier 106, i.e., the current reference I* is limited to the value set by the current limit setter. As a result, the torque of the motor 4 is limited to a value corresponding to the current limit value.

If, for instance due to misalignment of the vertical axis relative to the insertion hole of the workpiece, movement of the holder is obstructed, (such obstruction may happen if the holder or the part held by the holder engages with the edge of the insertion hole) the further advancement of the holder is prevented. Accordingly, overheating and burning-out of the motor 4, and mechanical damage to the robot itself and the part and the workpiece can be avoided.

Moreover, if the movement of the vertical axis is obstructed, the count value of the counter 1 becomes larger and ultimately exceeds the alarm limit value set by the setter 6. Then, the comparator 7 produces a signal of "1" level and a stall detection signal G is outputted through a switch 8a which is then closed because of the signal C being at "0".

The stall detection signal G is inputted to the computer 71 to interrupt the insertion operation program (i.e., to interrupt the insertion operation) and initiates execution of the remedy program. The remedy program may consists of raising the arm 60 and transfers the part 30 into a defective part pallet.

After execution of the remedy program, normal operation of the robot can be re-started.

While the holder is being retracted (e.g., raised), the insertion signal F is set at "0" and the limit to the current reference I* is removed. Moreover, a reset signal H is produced to reset the counter 1. This will prevent further (continued) production of the stall detection signal G.

Figure 4:
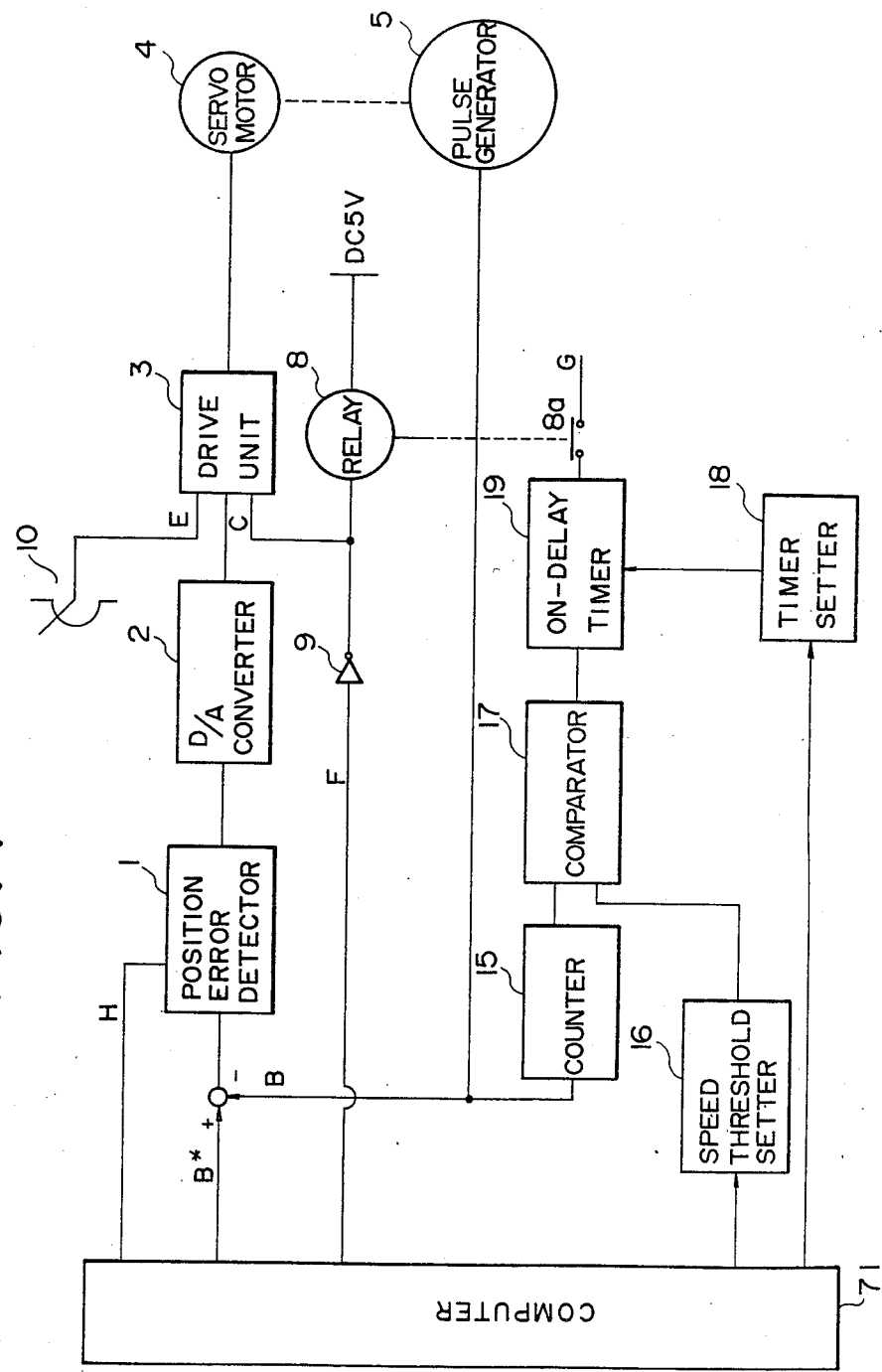
FIG. 4 is a block diagram showing another embodiment of the invention.
Figure 6:
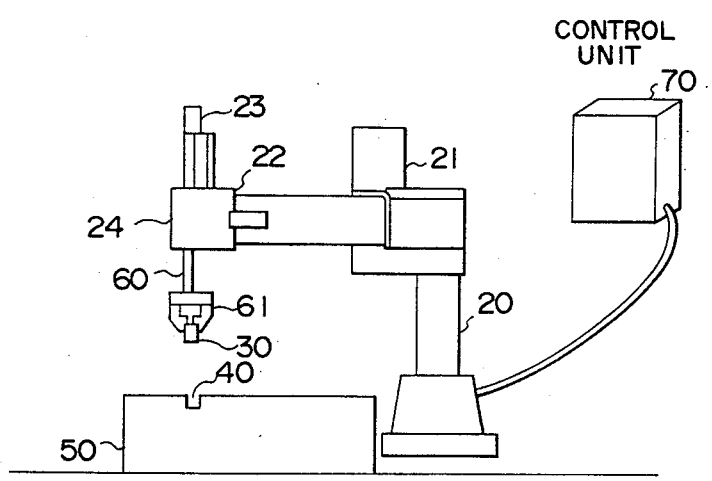
FIG. 6 is an elevational view of a robot working on a workpiece.

FIG. 4 shows another embodiment of the invention. The system of this embodiment comprises a counter 15 which counts the pulses from the pulse generator 5, and is cleared at a predetermined time interval. The count value of the counter 15 at the time immediately before it is cleared represents the speed of the motor 4.

A comparator 17 compares the count value of the counter 15 immediately before it is cleared, with a value set at a speed threshold setter 16, and the output of the comparator 17 is set at "1" when the former is smaller than the latter.

An on-delay timer 19, whose delay time is set by a time setter 18, receives the output of the comparator 17 and the output of the timer 19 becomes "1" when the output of the comparator is kept at "1" for a time period set by the time setter 18.

The output of the timer 19 is supplied through a switch 8a, if it is closed, as the stall detection signal G.

In this way, if the speed of the motor 4 is below a predetermiuned value (as set by the setter 16) continuously for a predetermined time period (as set by the setter 18), while the motor 4 is operated in the insertion mode, the stall detection signal G is produced.

Some of the circuit components such as those with reference numerals 1, 1a, 6, 7, 9, 15, 16, 17, 18 and 19 need not be in the form of discrete circuits but can be implemented as part of a programmed computer.

The invention has been described with reference to an embodiment, in which during the insertion operation, the current and the torque are limited and excessive position error triggers a remedy program. But the invention is applicable to any situation in which the movement of the operation axis is subject to undesired obstruction, such as close-fit insertion, screwing and mating and where such current and torque limiting and transfer to a remedy program is appropriate during movement of an operation axis.

The invention is not limited to operation of a vertical axis but is applicable to any operation axis.

I claim:

1. A control system for a robot having an operation axis and a servo motor driving the operation axis, said control system comprising:
    (a) position error detecting means detecting an error of the actual position with reference to a desired instantaneous position;
    (b) a drive circuit responsive to the position error for supplying a current to the servo motor to reduce the position error;
    (c) limit means for limiting the current supplied from the drive circuit to the servo motor, thereby to limit the torque of the servo motor;
    (d) switching means for turning on or off said limit means; and
    (e) means for setting a limit value, wherein the drive circuit comprises an operational amplifier with a limiter limiting the output of the operational amplifier to said limit value set by said setting means.

2. A system according to claim 1, further comprising: a programmed computer providing a reference signal for movement of the operation axis, and means detecting the rotation of the servo motor, and wherein said position error detecting means is responsive to said programmed computer and said detecting means for detecting an error of the actual position of the operation axis with reference to a desired instantaneous position as represented by said reference signal.

3. A control system for a robot having an operation axis and a servo motor driving the operation axis, said control system comprising:
    (a) position error detecting means detecting an error of the actual position with reference to a desired instantaneous position;
    (b) a drive circuit responsive to the position error for supplying a current to the servo motor to reduce the position error;
    (c) limit means for limiting the current supplied from the drive circuit to the servo motor, thereby to limit the torque of the servo motor;
    (d) switching means for turning on or off said limit means; and
    (e) stall detecting means for detecting stall of said operation axis, and transferring control to a remedy program under which the operation axis is moved for remedy, when said stall is detected while the limit means is in operation.

4. A system according to claim 3, further comprising: a programmed computer providing a reference signal for movement of the operation axis at least in said first mode and in a second mode in which the operation axis is moved for remedy under control of a remedy program, and rotation detection means detecting the rotation for the servo motor, wherein said stall detecting means comprises means responsive to said programmed computer and said detecting means for detecting an error of the actual position of the operation axis with reference to a desired instantaneous position as represented by said reference signal, and means for transferring control to the remedy program when the position error exceeds a predetermined value while the limit means is in operation.

5. A system according to claim 4, wherein said rotation detecting means comprises a pulse generator producing pulses at a frequency proportional to the speed of said servo motor, said programmed computer produces pulses at a frequency proportional to the desired instantaneous speed of the motor, and said means for detecting the position error comprises means responsive to the pulses from the pulse generator and from said programmed computer for determining said position error.

6. A system according to claim 4, wherein said means for transferring control comprises a comparator comparing the position error with a predetermined value to produce an excessive error detection signal when the former exceeds the latter, and means permitting application of said excessive error detection signal, as said stall detection signal, to the computer while the limit means is in operation.

7. A system according to claim 3, wherein said stall detecting means comprises means for producing a stall detection signal when the servo motor is rotating at a speed lower than a pre-determined value continuously for a predetermined time period.

8. A system according to claim 7, wherein said rotation detecting means comprises a pulse generator producing pulses at a frequency propotional to the speed of said servo motor, and said stall detecting means comprises means counting the pulses from the pulse generator and being periodically cleared, and means recognizing a stall when the count value is found to be less than a predetermined value at times immediately before the counter is cleared, and such a recognition is continued for a predetermined time period, while the limit means is in operation.

* * * * *